United States Patent
Zalewski et al.

(10) Patent No.: US 9,378,721 B2
(45) Date of Patent: Jun. 28, 2016

(54) LOW FREQUENCY ACOUSTIC ATTENUATOR AND PROCESS FOR MAKING SAME

(71) Applicant: ZIN TECHNOLOGIES, INC., Middleburg Heights, OH (US)

(72) Inventors: Bart F. Zalewski, Broadview Heights, OH (US); William B. Dial, Cuyahoga Falls, OH (US)

(73) Assignee: ZIN TECHNOLOGIES, INC., Middleburg Heights, OH (US)

(*) Notice: Subject to any disclaimer, the term of this patent is extended or adjusted under 35 U.S.C. 154(b) by 0 days.

(21) Appl. No.: 14/534,804

(22) Filed: Nov. 6, 2014

(65) Prior Publication Data

US 2015/0122577 A1    May 7, 2015

Related U.S. Application Data

(60) Provisional application No. 61/900,597, filed on Nov. 6, 2013.

(51) Int. Cl.
| | |
|---|---|
| *E04B 1/86* | (2006.01) |
| *G10K 11/172* | (2006.01) |
| *B29C 67/00* | (2006.01) |
| *B33Y 80/00* | (2015.01) |
| *B33Y 10/00* | (2015.01) |
| *B29K 101/12* | (2006.01) |
| *B29L 31/00* | (2006.01) |

(52) U.S. Cl.
CPC .......... *G10K 11/172* (2013.01); *B29C 67/0051* (2013.01); *B29K 2101/12* (2013.01); *B29L 2031/00* (2013.01); *B33Y 10/00* (2014.12); *B33Y 80/00* (2014.12)

(58) Field of Classification Search
CPC ..................................... E04B 1/86; B64F 1/26
USPC .................................................. 181/290, 210
See application file for complete search history.

(56) References Cited

U.S. PATENT DOCUMENTS

| | | | | |
|---|---|---|---|---|
| 5,959,265 | A * | 9/1999 | Van Ligten | 181/286 |
| 6,069,840 | A | 5/2000 | Griffin et al. | |
| 6,085,865 | A * | 7/2000 | Delverdier et al. | 181/292 |
| 6,231,710 | B1 | 5/2001 | Herup et al. | |
| 6,568,135 | B1 * | 5/2003 | Yokoyama et al. | 52/145 |
| 7,510,052 | B2 * | 3/2009 | Ayle | 181/292 |
| 7,902,944 | B2 | 3/2011 | Fukunag | |
| 8,028,802 | B2 * | 10/2011 | Durchholz et al. | 181/290 |
| 8,047,329 | B1 * | 11/2011 | Douglas et al. | 181/292 |
| 8,506,836 | B2 * | 8/2013 | Szuromi et al. | 216/102 |
| 8,521,320 | B2 | 8/2013 | Silverbrook | |
| 8,607,925 | B2 * | 12/2013 | Gideonse | 181/293 |
| 8,631,901 | B2 * | 1/2014 | Honji et al. | 181/293 |
| 2005/0258000 | A1 * | 11/2005 | Yano et al. | 181/210 |
| 2005/0284690 | A1 * | 12/2005 | Proscia et al. | 181/214 |
| 2011/0278091 | A1 * | 11/2011 | Honji et al. | 181/290 |
| 2013/0224423 | A1 | 8/2013 | Mikulak et al. | |

FOREIGN PATENT DOCUMENTS

| | | | |
|---|---|---|---|
| EP | 2 269 808 A1 | 1/2011 | |
| WO | WO 2004/011304 A2 | 12/2004 | |
| WO | WO 2006/118443 A1 | 11/2006 | |
| WO | WO 2013/043908 A1 | 3/2013 | |

* cited by examiner

*Primary Examiner* — Forrest M Phillips
(74) *Attorney, Agent, or Firm* — Tarolli, Sundheim, Covell & Tummino LLP

(57) ABSTRACT

A method of manufacturing an acoustic attenuation device includes three-dimensionally printing a pair of sheets and webs that cooperate with the sheets to define attenuation chambers. Each chamber has at least one opening through which excited air resonates.

23 Claims, 5 Drawing Sheets

LOW FREQUENCY ACOUSTIC ATTENUATOR AND PROCESS FOR MAKING SAME

PRIOR APPLICATIONS

This application claims the benefit of U.S. Provisional Application Ser. No. 61/900,597, filed Nov. 6, 2013, the entirety of which is incorporated herein by reference.

TECHNICAL FIELD

This disclosure relates generally to acoustic attenuation and, more specifically, relates to a chamber attenuator device formed by additive manufacturing.

BACKGROUND

Current mitigation technologies of low frequency spectrum attenuation include acoustic hangers, Helmholtz resonators, chamber core resonators, coverage tube resonators, large volume resonators, and large mass systems. These devices are problematic in that the manufacturing methods used consider the acoustic resonator design to be the same as a structural design and/or their performance is not broad band, i.e., the devices operate in a narrow frequency range, thereby limiting the effective range of environments in which the devices can be used. Furthermore, these devices can be expensive to manufacture in that they are sequentially constructed in an add-on manner.

SUMMARY

A method of manufacturing an acoustic attenuation device includes three-dimensionally printing a pair of sheets and webs that cooperate with the sheets to define attenuation chambers. Each chamber has at least one opening through which excited air resonates.

In another example, an acoustic attenuation device extends from a first end to a second end and includes first and second sheets. A plurality of webs positioned between the first and second sheets cooperates with the first and second sheets to form a series of sound attenuation chambers containing a volume and mass of air. A first panel secured to the sheets closes the chambers at the first end of the device. A second panel secured to the sheets closes the chambers at the second end of the device. An opening through which excited air resonates is in fluid communication with each chamber.

DETAILED DESCRIPTION

Figure 1:
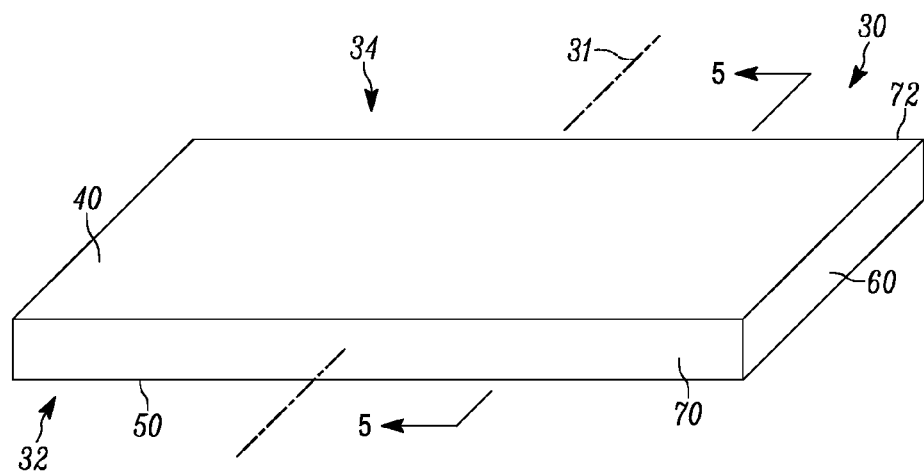
FIG. 1 illustrates an example of a chamber attenuator device.

This disclosure relates generally to acoustic attenuation and, more specifically, relates to a chamber attenuator device formed by additive manufacturing. The use of additive manufacturing reduces the touch labor, decreases cost, and provides adequate manufacturing tolerances for the device. Additive manufacturing also mitigates issues related to hermetically sealing the chambers of the device such that the chambers resonate at the appropriate frequency. Thus, the versatility of additive manufacturing allows the device to be fabricated in its entirety as one component or pieced together from smaller pieces, which then can be joined hermetically. Furthermore, due to improved certainty in the quality of the hermetic seal, the chambers formed using additive manufacturing advantageously provide improved noise reduction, transmission loss, and absorption compared to conventional sound attenuator manufacturing techniques Additionally, additive manufacturing allows each device to be custom designed and manufactured per acoustic and spatial requirements while minimizing the effects on design and manufacturing costs. This allows the device to be optimized and provide desired attenuation levels at desired frequencies. The design/manufacturing process involves designing the device in a computer-aided design (CAD) or similar format and then sending the design (e.g., embodied in a computer-readable medium) directly to the three-dimensional (3D) printer for manufacturing. Each component of the device can be printed with identification numbers to facilitate installation and assembly.

This disclosure specifically relates to a method of making a broad band low frequency tube resonator type acoustic attenuation device. The low frequency acoustic attenuation device described herein advantageously provides a cost effective means of low frequency mitigation that is also coverage efficient by utilizing additive manufacturing to specifically tailor the device components in a reliable manner. Single purpose acoustic attenuation device produced by additive manufacturing allows component level qualification of acoustic attention devices that is both cost and schedule effective.

The device can be used to attenuate frequencies in the range from about ~20 Hz to about ~200 Hz, i.e., where either large volume resonators or large mass systems are traditionally used. Accordingly, the device is useful in space launch vehicles that exhibit low frequency acoustic problems as well as in any other application for attenuating low frequency acoustic noise. The device disclosed herein can also be used in music studios, houses, apartments, construction areas, railroad cars, etc. or in any other application that requires broad band low frequency attenuation. The device can be formed as its own stand-alone component or can be used as a pure add-on that does not require extensive structural requalification of currently existing products.

The device mitigates acoustic noise by utilizing acoustic chambers, each with an opening, that act as resonators and allow air molecules to vibrate through the openings. The initially stationary air inside of a chamber is excited by a pressure wave and moves outside of the chamber through an opening. As the air exits, it creates a pressure difference between the inside and outside of the chamber, thereby forcing the air to move back inside of the chamber through the same opening. The air continues to vibrate through the opening at the chamber's resonant frequency, analogue to a tuned mass damper, which dissipates acoustic energy.

FIGS. 1-4A illustrate an example of an acoustic attenuation device or resonator 30 that can be integrally formed as a single, collective unit as opposed to separate components secured together. The device 30 extends generally along an axis 31 from a first end 32 to a second end 34. The device 30 includes a first panel or sheet 40 and a second panel or sheet 50 that can each be substantially planar. It is contemplated that the first and second sheets 40, 50 can extend at angles relative to one another or can be parallel. The first and second sheets 40, 50 are spaced apart from one another by a plurality of webs 60 (FIG. 2) extending along or substantially parallel to the axis 31. Although the sheets 40, 50 are illustrated as being planar and extending parallel to one another, it will be appreciated that either or both sheets can be curved or contoured in one or more directions (not shown). The webs 60 can also extend at an angle(s) relative to one another and/or be curved in one or more directions (not shown).

As used herein, the term "substantially" is intended to indicate that while the property or condition modified by the term can be a desirable property or condition, some variation can occur. In this context, for example, the term "substantially planar" demonstrates that the panel or sheet can be a flat sheet although it can exhibit some minor curves, protrusions or other variations apart from being completely flat The webs 60 cooperate within the first and second sheets 40, 50 to define a plurality of sound attenuation chambers 64 within the device 30. In one example, each chamber 64 has a substantially rectangular cross-section, although alternative cross-sectional shapes are contemplated. The chambers 64 define a predetermined volume and mass of air that resonates upon excitation. One or more partitions 68 can be provided within each chamber 64, with each partition having the same perimeter P as the cross-section of the chamber in which it is provided. In this way, the perimeter of P each partition 68 is air-tight, i.e., hermetically sealed, with the sheets 40, 50 and support members 60.

It is also possible that an individual resonator 30 can be comprised of an entire single chamber 64 or multiple chambers, i.e., discrete chamber(s) or interconnected chambers extending back and forth between the first and second ends 32, 34. If multiple, interconnected chambers 64 are used to form a single resonator 30 an opening 63 between the chambers is constructed in the webs 60 to form a layout similar to that shown in FIG. 6. Due to this construction, each chamber 64 may be divided into two sections 64a, 64b by the respective partition 68. The first section 64a has a length, indicated at $L_1$, extending parallel to the axis 31 from the first end 32 to the partition 68 within the chamber 64. The second section 64b has a length, indicated at $L_2$, extending parallel to the axis 31 from the partition 68 to the second end 34 of the chamber 64. The thickness of each web 60 and each sheet 40, 50 can be adjusted such that each chamber 64 and each chamber section 64a, 64b has a predetermined cross-section, which may be constant or vary along each chamber length $L_1$ and may be constant or vary along each chamber length $L_2$. In other words, any portion of each web 60 and/or each sheet 40, 50 can have a variable thickness relative to any other portion of that web and/or sheet.

Depending on each respective acoustic chamber length, $L_1$ and $L_2$, each section 64a and 64b is tuned to an independent frequency. In other words, the length of the chamber section 64a, 64b varies the acoustic, resonant frequency of that chamber section by changing the volume and mass of air therein. Consequently, placing the partition 68 in each chamber 64 at a specific, predetermined position dictates the lengths $L_1$, $L_2$ of the sections 64a, 64b to independently tune each chamber section to a desired frequency, thereby readily improving the efficiency of the device 30 without increasing manufacturing time or cost.

Figure 2:
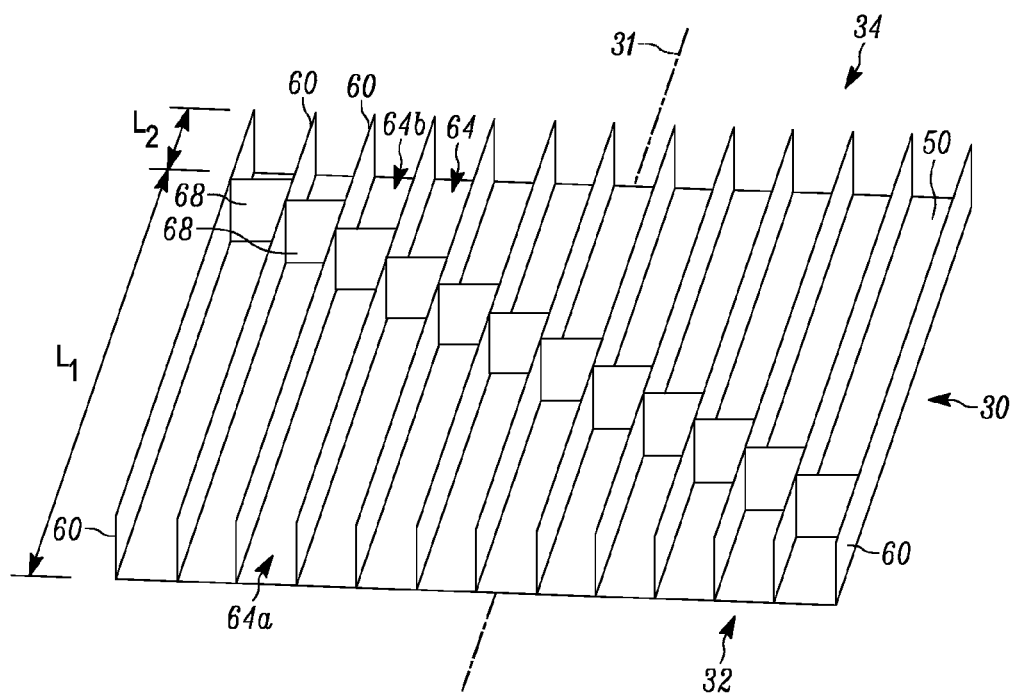
FIG. 2 illustrates a sectional view of the attenuator device of FIG. 1.

Each partition 68 can be located at the same longitudinal position along the axis 31 as other partitions such that the first sections 64a all have the same length $L_1$ and the second sections 64b all have the same length $L_2$. Alternatively, one or more partitions 68 can be located at a different longitudinal position relative to other partitions such that the lengths $L_1$, $L_2$ vary between chambers 64. As shown in the example of FIG. 2, the partitions 68 are arranged in a step-like pattern such that the first length $L_1$ decreases and the second length $L_2$ increases across consecutive chambers 64 in the left to right direction. In this configuration, each partition 60 has a different longitudinal position within each chamber 64 relative to each other partition.

Figure 3:
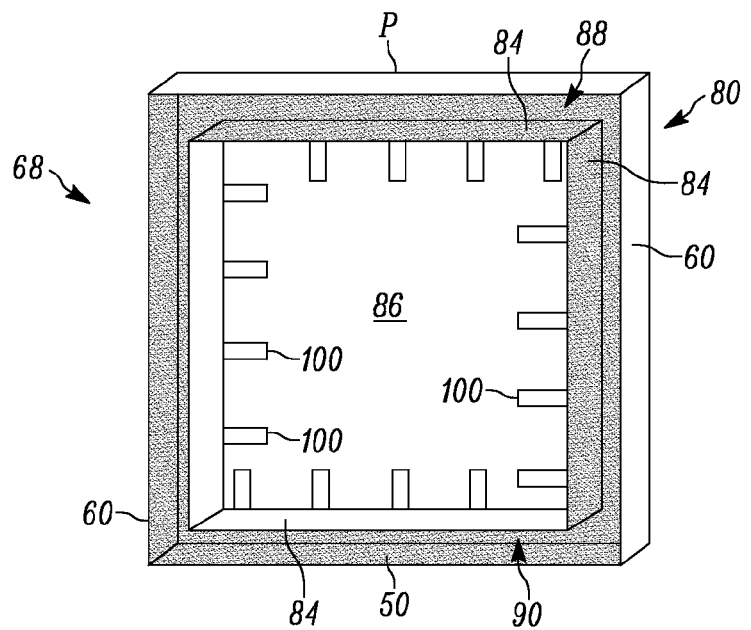
FIG. 3 illustrates a front view of a partition of the attenuator device of FIG. 1.

FIG. 3 illustrates a detailed view of an alternative cross-section of the chamber 64 from the example attenuator of FIG. 2. The chamber 64 cross-section can include an outer wall 80, an inner wall 84, and a central panel 86. The outer wall 80 is defined by the first and second sheets 40, 50 and a pair of adjacent webs 60. Alternatively, the outer wall 80 can be a separately formed component placed between the sheets 40, 50 and adjacent webs 60 and hermetically sealed therewith (not shown).

The inner wall 84 is spaced from the outer wall 80 and, in one example, is concentric with the outer wall. An annular space 88 between the outer wall 80 and the inner wall 84 is filled with a granular or powder material 90 that provides additional mass damping in the same manner as inertial shock dampers. The material 90 can be provided between the walls 80, 84 by polymer binder jetting or any other technique that traps the material between the walls. Alternatively, the annular space 88 can be empty (not shown).

The central panel 86 is enclosed around its perimeter by the inner wall 84. One or more damping fibers 100 can extend through and/or along the central panel 86. The damping fibers 100 provide additional energy dissipation means by providing further resistance to the passage of air molecules through the partition 80. In one example, the damping fibers 100 extend radially inwardly towards the interior of the central panel 86. The damping fibers 100 can be integrally formed within the central panel 86 during the additive manufacturing process or can be separately formed and provided on or in the central panel after the remainder of the panel is formed.

Figure 4A:
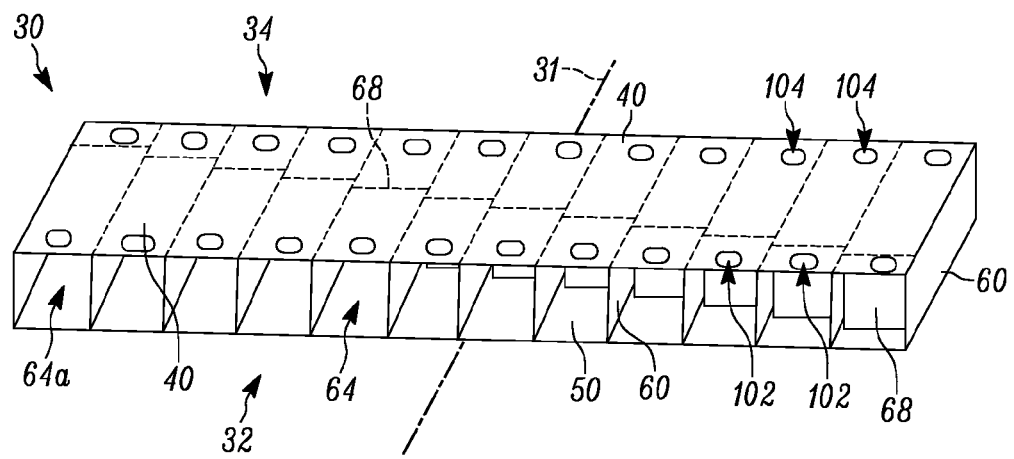
FIG. 4A illustrates a front view of the attenuator device of FIG. 1 with a front panel removed.

Referring to FIG. 4A, a series of openings 102, 104 extends through the first sheet 40 at the first and second ends 32, 34, respectively, of the device 30 for providing a fluid communication pathway between the chambers 64 and ambient or the environment outside the device 30. In some examples, a pair of openings 102, 104 is associated with each chamber 64 such that one opening 102 is associated with one chamber section 64a and the other opening 104 is associated with the other chamber section 64b. Each opening 102, 104 can be round, square or have any other shape. The openings 102, 104 can be the same as one another for each chamber 64 (as shown) or can be different from one another in the same chamber or across different chambers. Each associated pair of openings 102, 104 can have the same or different spacing from one another as each other associated pair of openings. Each opening 102, 104 can therefore be located anywhere along the length $L_1$ or $L_2$ of each associated chamber section 64a, 64b. It is advantageous to locate each opening 102, 104 closer to an end of each respective chamber section 64a, 64b to maximize the length $L_1$ or $L_2$ over which the excited air can attenuate. In one example, the chambers 64 are configured to have a frequency spacing of about 3 Hz relative to one another to help limit the effects of anti-peak on the sound attenuation.

As shown in FIG. 1, an end panel 70 closes the chambers 64 at the first end 32 of the device 30. An end panel 72 likewise closes the chambers 64 at the second end 34 of the device 30. The end panels 70, 72 and sheets 40, 50 are hermetically sealed to one another such that the openings 102, 104 are the only means by which fluid, e.g., air, can enter or exit the device 30.

In operation, the device 30 mitigates acoustic noise by utilizing the acoustic chambers 64 and associated openings 102, 104, which act as resonators and allow excited air molecules to vibrate through the openings. The initially stationary air inside of each chamber section 64a, 64b is excited by a pressure wave and moves outside of the chamber section through the associated opening 102, 104. As the air exits, it creates a pressure difference between the inside and outside of the chamber section 64a, 64b, thereby forcing the air to move back inside of the chamber section through the same opening 102 or 104. The air continues to vibrate through the opening 102 or 104 based upon the chamber's resonant frequency—similar to a tuned mass damper—which dissipates the acoustic energy of the excited air. The chamber sections 64a, 64b are hermetically sealed from one another and, thus, vibrating air within one chamber section does not pass to another chamber section. Rather, the air can only enter or exit each chamber section 64a, 64b through the respective opening 102, 104. The damping fibers 100, where present, provide additional energy dissipation means for the excited air.

Figure 4B:
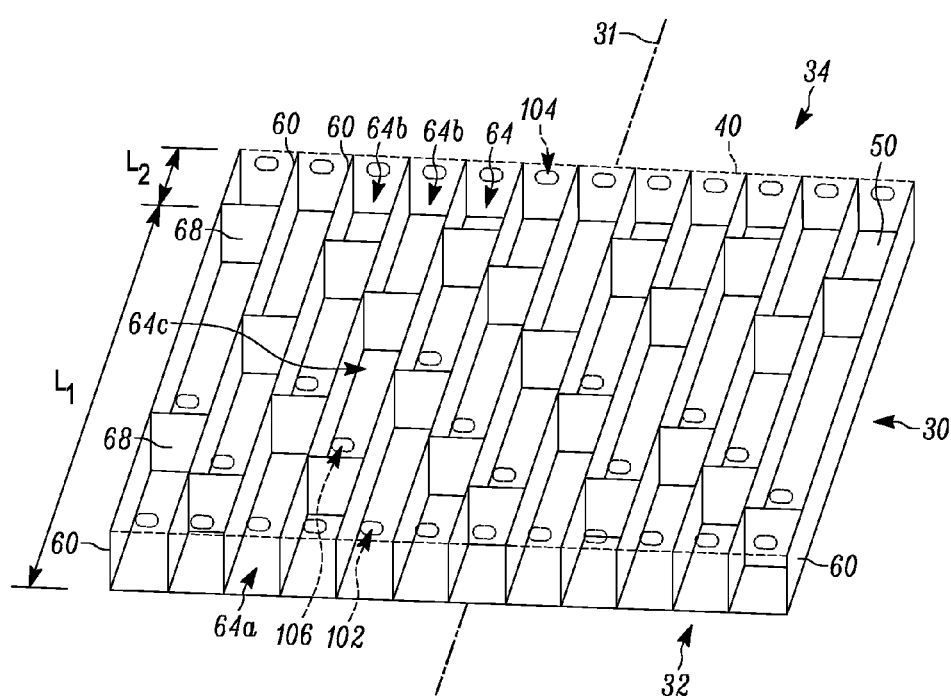
FIG. 4B illustrates a top view of an alternative attenuator device.

In another example shown in FIG. 4B, each chamber 64 includes two partitions 68 along the length of the chamber, thereby forming three hermetically sealed chamber sections 64a, 64b, 64c within each chamber. Consequently, the openings 102 are provided through the first sheet 40 at one end of each chamber section 64a. The openings 104 are provided through the first sheet 40 at one end of each chamber section 64b. Openings 106 are provided through the first sheet 40 at one end of each chamber section 64c. The partitions 68 can be positioned anywhere along the length of each chamber 64 to specifically tailor the lengths $L_1$, $L_2$, $L_3$ of each chamber section 64a, 64b, 64c. The chamber sections 64a, 64b, 64c in FIG. 4B operate in the same manner as the chamber sections 64a, 64b in the device 30 of FIGS. 1-4.

The acoustic attenuation device 30 disclosed herein can be advantageously formed using 3D printing—also known as additive manufacturing. Unlike the structural/acoustic coupled chamber core resonators, additive manufacturing allows the device 30 to be readily customized to meet the attenuation and frequency requirements of the particular application and environment without changing the structural design of the device. Using additive manufacturing to produce the device 30 therefore provides more design flexibility, a wider usage, and more optimized control in obtaining desired acoustic attenuation requirements. The use of additive manufacturing to produce the device 30 can accommodate low frequency attenuation without the necessity of long chambers as with current attenuation designs. Materials that can be used in additive manufacturing to form the components of the device 30 include, but are not limited to, aluminum, brass, copper, tin, lead, magnesium, zinc, titanium, steel, stainless steel, and alloys thereof, ceramics, polymers such as thermoplastics, e.g., polyvinylchloride, and paper. The particular material(s) chosen for each component of the device 30 is based upon desired product requirements and performance criteria.

Additive manufacturing processes that can be used to form the device 30 include, but are not limited to, extrusion, extrusion deposition, granular material binding, lamination, photopolymerization, and binder jetting. The complete device 30 illustrated can therefore be formed entirely by additive manufacturing or by hermitically adhering the end panels 70, 72 to the first and second sheets 40, 50 after the rest of the device has been 3D printed.

Figure 5:
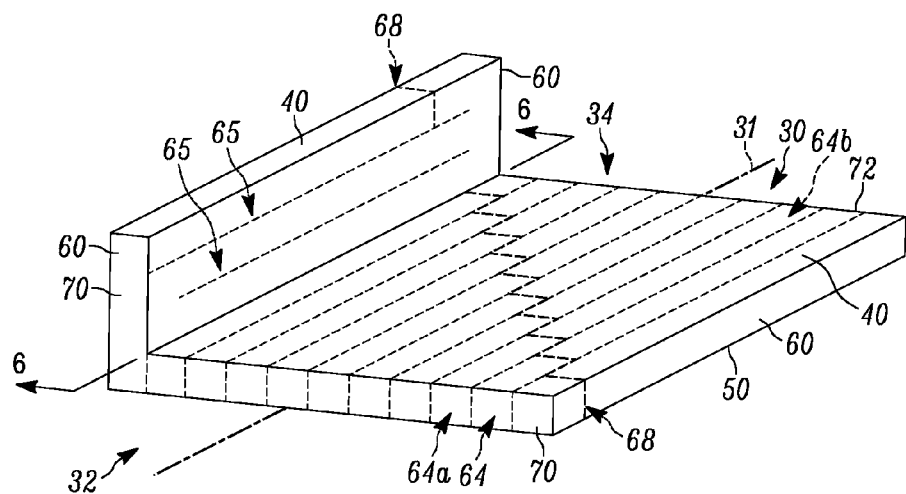
FIG. 5 illustrates a chamber attenuator device with chambers positioned in multiple planes.

Due to the flexibility in customizing each device 30 afforded by additive manufacturing, the sheets 40, 50, webs 60, and end panels 70, 72 can be printed to form chambers that reside in one plane ("in-plane") and multiple planes ("out-of plane"), e.g., horizontal and vertical planes. In one example of this construction illustrated in FIGS. 5 and 6, multiple chambers 64 are arranged in a horizontal plane and multiple chambers 65 are arranged in a vertical plane, with the chambers 65 being stacked atop the leftmost chamber 64. With this configuration, the effective acoustic length of the collective chambers 64, 65 can be increased, which results in a decreased frequency within the chambers. Increasing the chamber 65 length in the vertical direction has little to no negative impact on the overall device 30 frequency coverage as adjacent chambers 65. Any number of partitions 68, including zero, can be positioned within each chamber 64, 65.

Figure 6:
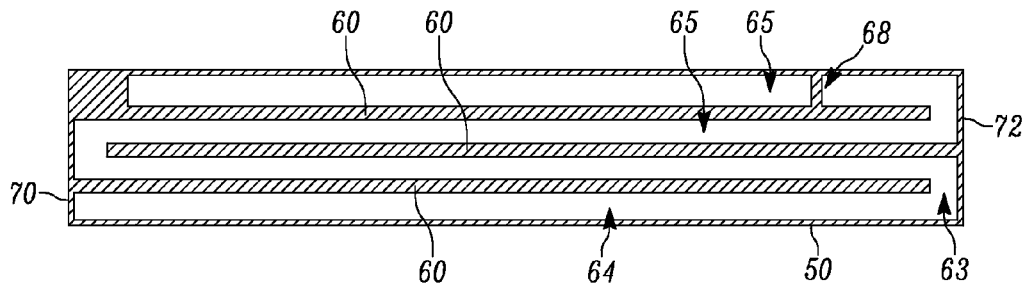
FIG. 6 is a section view of FIG. 5 taken along line 6-6.

As shown in FIG. 6, the vertical plane chambers 65 can form a single, elongated chamber having a substantially longer acoustic length than any of the discrete chambers 64 in the horizontal plane. The device 30 can include any number of different length chambers 64, 65 to accommodate a range of desired frequencies, for example. The openings 102, 104 are omitted in FIG. 5 for clarity but would be associated with each chamber 64, 65 in the manner previously described.

The effective acoustic length of the device 30 can be further increased by providing one or more additional, out-of plane chambers 65 atop other chambers 64 (not shown). In other words, the device 30 of FIG. 5 can be further modified to include one or more stacks of vertical chambers 65 extending parallel to the chambers 65 shown in FIG. 5. Any additional chambers 65 would be spaced from the openings 102, 104 of the chambers 64 to ensure air flow therethrough. Increasing the number of chambers 64 and/or 65 increases the frequency range over which the device 30 can operate.

Figure 7:
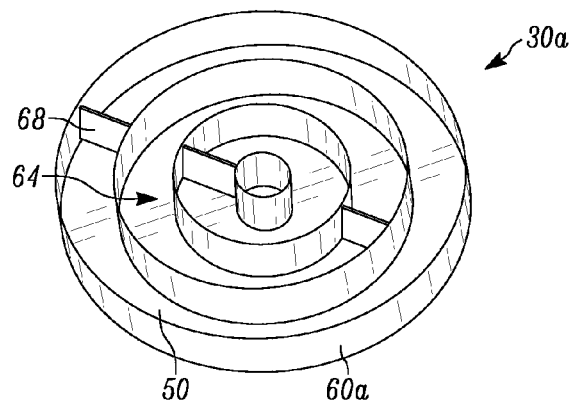
FIG. 7 illustrates an example of a circular chamber attenuator device.

Referring to FIG. 7, additive manufacturing also readily allows for the printing and formation of a device 30a having chambers 64 with a non-linear construction. In one example, the chambers 64 can be circular and arranged concentrically. The frequency of these non-linear chambers 64 is based on their effective acoustic length, measured circumferentially. Similar to the chambers 64 in the device 30, zero or many partitions 68 can be placed within each chamber 64 of the device 30a. Alternatively, the non-linear device 30a may have an oval, cylindrical, conical, ogival or spiral shape or any polygonal shape, e.g., square, rectangular or triangular (not shown).

Figure 8:
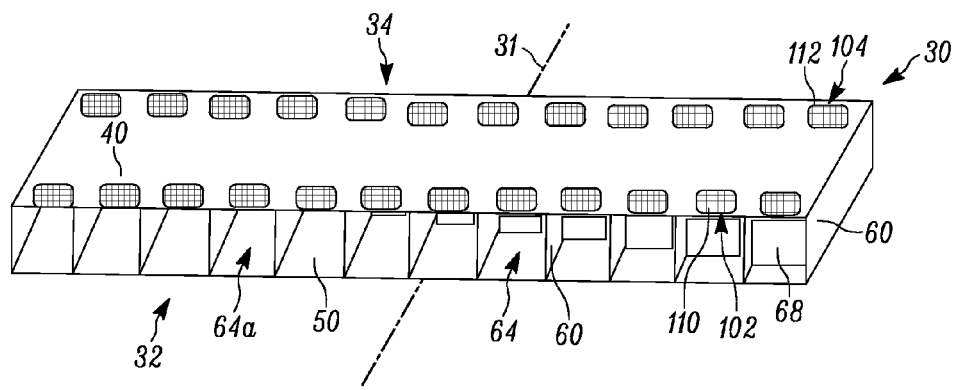
FIG. 8 illustrates the attenuator device of FIG. 1 with mesh over the openings.

In another example, FIG. 8 illustrates a device 30b in which the openings 102, 104 are covered by mesh 110 and 112, respectively. The mesh 110, 112 can be a three-dimensional printed component integral with the first sheet 50 or can be added, e.g., via ultrasonic welding, adhesive or other means of affixation, after the remainder of the device 30b is manufactured. The mesh 110, 112 provides damping and widens the frequency range over which each chamber 64 attenuates. To this end, the pattern and/or density of the mesh 110, 112 may be tailored to provide the desired degree of damping for each associated opening 102, 104.

Figure 9:
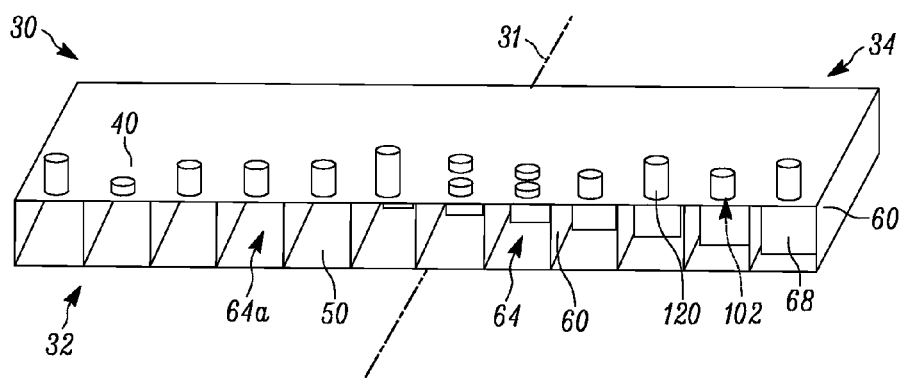
FIG. 9 illustrates the attenuator device of FIG. 1 with necks over the openings.

Referring to FIG. 9, the device 30 can alternatively or additionally be provided with tubular necks 120 integrally formed at each opening 102 on the first end 32 of the device 30 or added, e.g., via ultrasonic welding, adhesive or other means of affixation, after the remainder of the device 30 is manufactured. The necks 120 change the frequency of each respective chamber 64 and can be used for fine tuning the device 30 according to a desire range of frequencies to be attenuated. Thus, each neck 120 can have a particular height extending away from the first sheet 40 to fine tune that specific chamber 64 accordingly. Any number of openings 102, including zero (i.e., no opening), can include a neck 120 and each neck can be the same as or different from every other neck. Alternatively or additionally, the necks 120 can be provided on one or more of the openings 104 (not shown). The mesh 110, 112, when present, can be integrally formed with or secured over an opening of the neck 120. When desired, multiple openings 102 with multiple necks 120 can be provided for a single chamber 64. It will be appreciated that the mesh 110, 112 and/or necks 120 can be used in any device 30 described herein.

Similarly, it will be appreciated that any of the features or constructions shown in the figures can be combined with features in other figures. For example, the multi-plane configuration shown in FIGS. 5 and 6 can include non-linear chambers 64 and/or 65, which can include mesh and/or necks in accordance with the present disclosure.

What have been described above are examples. It is, of course, not possible to describe every conceivable combination of components or method, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method of manufacturing an acoustic attenuation device, the method comprising:
    Three-dimensionally printing a pair of sheets and webs that cooperate with the sheets to define broadband sound attenuation chambers, each chamber having at least one opening through which excited air resonates, further comprising three-dimensionally printing a partition along the length of at least one chamber to divide the at least one chamber into a pair of chamber portions, each partition including an inner wall and an outer wall spaced from the inner wall by an annular space.

2. The method recited in claim 1 wherein the annular space between the outer wall and the inner wall is empty.

3. The method recited in claim 1 further comprising three-dimensionally printing mesh extending over at least one opening for damping the excited air through the opening.

4. The method recited in claim 1 further comprising three-dimensionally printing a neck outside the chambers in fluid communication with at least one opening for varying an acoustic frequency of the chamber.

5. The method recited in claim 1 further comprising three-dimensionally printing a partition along a longitudinal length of at least one chamber to divide the chamber into a pair of chamber portions for damping the excited air.

6. The method recited in claim 5 wherein the chamber portions have different lengths.

7. The method recited in claim 5 wherein the at least one opening comprises a pair of openings, each opening associated with one of the pair of chamber portions.

8. The method recited in claim 5 wherein each partition includes an inner wall, an outer wall, and a powdered material between the inner wall and the outer wall.

9. The method recited in claim 5, wherein the partition includes damping fibers that dissipate energy to provide resistance to the passage of the excited air through the partition.

10. The method recited in claim 1, wherein multiple chambers are interconnected through an opening in a web between two or more adjacent chambers.

11. The method recited in claim 1 further comprising three-dimensionally printing a partition along the length of each chamber to divide each chamber into a pair of chamber portions, each partition having a position along the length of the respective chamber different from each other partition.

12. The method recited in claim 11 wherein each partition includes an inner wall, an outer wall, and a powdered material between the inner wall and the outer wall.

13. The method recited in claim 1 wherein the chambers are centered about a common axis and concentric with one another.

14. A method of manufacturing an acoustic attenuation device, the method comprising:
    three-dimensionally printing a pair of sheets and webs that cooperate with the sheets to define attenuation chambers, each chamber having at least one opening through which excited air resonates, wherein the chambers include a plurality of first chambers in a first plane and a plurality of second chambers arranged in a second plane that is perpendicular to the first plane.

15. The method recited in claim 1 wherein the step of three-dimensionally printing the pair of sheets and the webs comprises extrusion deposition.

16. The method recited in claim 1 further comprising three-dimensionally printing a first panel into the sheets to close a first end of each chamber and three-dimensionally printing a second panel into the sheets to close a second end of each chamber.

17. An acoustic attenuation device extending from a first end to a second end comprising:
    first and second sheets;
    a plurality of webs positioned between the first and second sheets and cooperating with the first and second sheets to form a series of sound attenuation chambers containing a volume and mass of air;
    a partition positioned along the length of at least one chamber to divide the at least one chamber into a pair of chamber portions, each partition including an inner wall and an outer wall spaced from the inner wall by an annular space;
    a first panel secured to the sheets and closing the chambers at the first end of the device;
    a second panel secured to the sheets and closing the chambers at the second end of the device; and
    an opening through which excited air resonates in fluid communication with each chamber.

18. The acoustic attenuation device of claim 17 wherein the chamber partition has a cross section for damping the excited air, a powdered material being positioned in the annular space between the inner wall and outer wall.

19. The acoustic attenuation device of claim 17 wherein at least one opening is covered by mesh for damping the excited air through the opening.

20. The acoustic attenuation device of claim 17 wherein a cross-section of the partition includes damping fibers that dissipate energy to provide resistance to the passage of the excited air through the partition.

21. The acoustic attenuation device of claim 17 wherein the chambers comprise a plurality of first chambers in a first plane and at least one second chamber in a second plane different from the first plane.

22. The acoustic attenuation device of claim 17 wherein the chambers include a plurality of first chambers in a first plane and a plurality of second chambers arranged in a second plane perpendicular to the first plane.

23. The acoustic attenuation device of claim 17 wherein the annular space between the outer wall and the inner wall is empty.

* * * * *